(12) United States Patent
Roth et al.

(10) Patent No.: US 6,544,056 B1
(45) Date of Patent: Apr. 8, 2003

(54) TEMPERATURE-CONTROLLED WIRE SUPPORT

(75) Inventors: Martin Roth, Taufkirchen (DE); Andreas Schuster, Alsfeld (DE); Heinz Voggenreiter, Munich (DE); Harald Vorbrugg, Munich (DE); Markus Reindl, Karlsfeld (DE)

(73) Assignee: Eads Deutschland GmbH (DE)

( * ) Notice: Subject to any disclaimer, the term of this patent is extended or adjusted under 35 U.S.C. 154(b) by 0 days.

(21) Appl. No.: 09/787,726

(22) PCT Filed: Sep. 14, 1999

(86) PCT No.: PCT/DE99/02902

§ 371 (c)(1),
(2), (4) Date: Mar. 21, 2001

(87) PCT Pub. No.: WO00/017961

PCT Pub. Date: Mar. 30, 2000

(30) Foreign Application Priority Data

Sep. 24, 1998 (DE) .......................................... 198 43 966

(51) Int. Cl.$^7$ ................................................ H01R 13/20
(52) U.S. Cl. ...................................... 439/161; 439/395
(58) Field of Search ................................ 439/161, 395, 439/521, 396–400

(56) References Cited

U.S. PATENT DOCUMENTS

| | | | | |
|---|---|---|---|---|
| 3,726,005 A | * | 4/1973 | Prostor ........................... | 29/605 |
| 4,487,465 A | | 12/1984 | Cherian et al. | |
| 4,505,767 A | | 3/1985 | Quin .............................. | 148/402 |
| 5,030,132 A | * | 7/1991 | Hayes et al. ................... | 439/397 |
| 5,274,909 A | * | 1/1994 | Listing ........................... | 29/753 |
| 5,482,467 A | | 1/1996 | Nolf et al. ..................... | 439/161 |
| 6,149,742 A | * | 11/2000 | Carpenter et al. ............. | 148/563 |

FOREIGN PATENT DOCUMENTS

CH 677987 7/1991

* cited by examiner

Primary Examiner—Tulsidas Patel
Assistant Examiner—Son V. Nguyen
(74) Attorney, Agent, or Firm—Ladas & Parry

(57) ABSTRACT

The invention solves the task of creating a temperature-controlled wire holder that enables a reliable and controlled release. This task is solved by the invention in that the wire holder (1) is produced from a shape memory material, and that the wire (14) is clamped in an aperture (2) of the wire holder (1) by compression of the aperture (2), and that the compressed aperture (2) opens by itself when the wire holder (1) is heated to a specific operating temperature, thus releasing the wire. The invention may be used in a temperature-controlled wire holder that releases a secured wire (14) under mechanical tension when a specific operating temperature is achieved.

19 Claims, 3 Drawing Sheets

TEMPERATURE-CONTROLLED WIRE SUPPORT

FIELD OF THE INVENTION

The invention concerns a temperature-controlled wire holder that releases a wire under mechanical tension according to temperature.

BACKGROUND

In the field of space travel, a method is known (DE-A1-196 49 739) to secure the bent end of a wire under tension using a fusible link that melts when current is passed through it, thus releasing the wire. The fusible wire under tension (shaped as a coil) holds two halves of a two-part pin bracket together. When the wire is released, the two halves of the pin bracket separate under spring tension, releasing the pin from the bracket. Such pins may be used, for example, to hold solar panels in a collapsed state during rocket launch that are later freed by the release of the pin upon achievement of the mission goal. The use of a fusible link has the disadvantage of uncontrolled and undefined release.

SUMMARY OF THE INVENTION

From U.S. Pat. No. 4,487,465, a temperature-controlled wire holder made of shape memory material is known in which two free arms are mounted to a base by means of which a wire is held in an opening formed by the arms. The disadvantage of such a configuration is that the manufacturing process is extremely complex, and the temperature at which the arms open may be changed only by altering the shape memory alloy.

This task is solved by the invention by means of the characteristics of Patent claim 1. Additional embodiments of the invention are presented in the sub-claims.

The invention uses the characteristics of alloys that possess memory characteristics, so-called shape memory alloys based on TiNi alloys. Such alloys, for example, are known to possess two different solid phases, namely martensitic at low temperature and austenitic at high temperature, with a progressive phase transition as the alloy is heated.

The so-called "one-way effect" of such alloys is used to advantage. For this, a "pseudo-plastic" deformation of the martensite alloy is created that is known to re-form as austenite during temperature increase. Subsequent cooling into martensite, however, does not lead to further deformation, but rather the alloy remains in the condition characteristic of austenite.

The wire holder based on the invention has the advantage that it consists of fewer pieces, and may be incorporated into existing designs because of its compact design, thereby simplifying known installations with wire holders. A further advantage of the holder based on the invention consists in the fact that no pieces are broken loose or destroyed during the release of the wire, in contrast to pyrotechnical release processes. Using an application of shape memory alloys based on TiNi that have been pretreated using a special mechanical process, the austenite triggering temperature lies significantly above the values of commercially-available TiNi alloys. By the use of such alloys, wire holders based on the invention may be used in higher-temperature applications such as those encountered during space missions.

BRIEF DESCRIPTION OF THE DRAWING

Embodiments of the invention are described in more detail with reference to the following figures.

DETAILED DESCRIPTION

Figure 1:
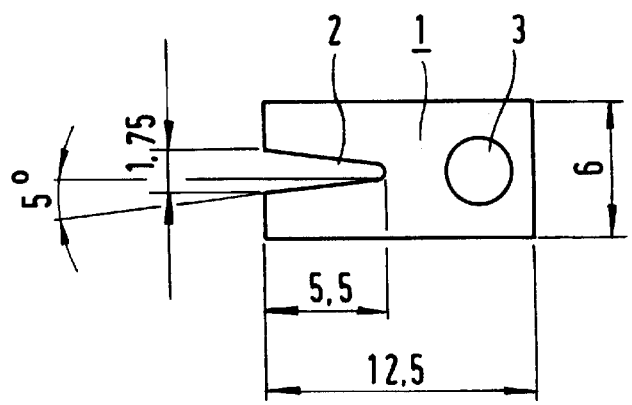
FIG. 1 shows a wire holder with friction closure.

The embodiment example shown in FIG. 1 is a wire holder 1 eroded from a TiNi plate that includes an aperture 2 configured as a notch on one edge that may be compressed for the purpose of clamping a wire inserted into it. A hole 3 serves to secure the wire holder 1 in a bracket mount 6; shown in detail in FIG. 3. The wire holder is shown in FIG. 1 on enlarged scale.

The TiNi plate has the dimensions of 12×22×1 mm before erosion, and is treated with a special rolling process so that the value of the austenite triggering temperature of the wire holder 1 (i.e., the operating temperature) is greater than 100° C.

As a deviation from the representation of a wire holder as a rectangular plate in FIG. 1, other chassis shapes may be considered as required in which a compressible aperture may be included. Thus, for example, the wire holder may be configured as a disk with an aperture that may be closed when compressed. The configuration of the compressible aperture 2 may also be transformed as necessary from the notch shown in FIG. 1. Apertures shaped as slots or blind holes are also conceivable. The determining factor during selection of the shape is the achievement of sufficient clamping and releasing action. Selection of the material is determined by the desired austenite triggering temperature. Various TiNi alloys with shape memory may be used.

The dimensions of the wire holder 1 and the aperture 2 shown in FIG. 1 are for the example of a wire holder with a holding force of about 5 kg, and may be adapted as necessary to other spatial and holding force requirements.

Figure 2:
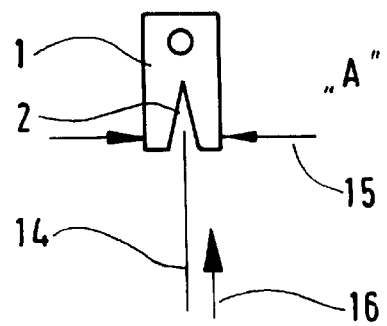
FIG. 2 shows the progression of the clamping and release processes of this wire holder.
Figure 2:
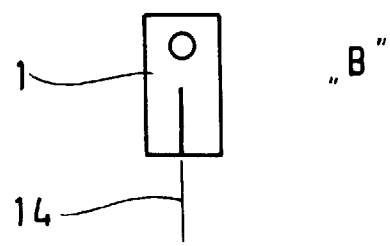
Figure 2:
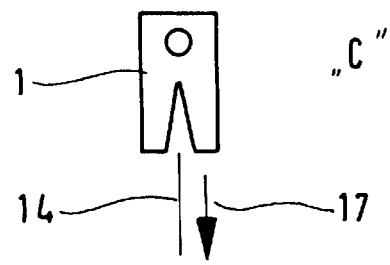

The progression of the clamping and release processes shown in FIG. 2 is represented with the sequential process stages "A", "B" and "C." During process stages "A" and "B" the wire holder is martensite at lower temperatures, and becomes austenite during process "C" at higher temperature. In stage "A" the aperture 2 of the pressure holder 1 is compressed, as shown in FIG. 2 with the directional arrows 15. Subsequently, as directional arrow 16 shows in FIG. 2, the wire 14 is pressed into the previously-compressed aperture 2. This procedure causes a strong holding force on the clamped wire during the clamping process. The compression of the aperture 2 may also be performed after the wire has been inserted into the aperture, in contrast to the process previously described. Process stage "B" shows the wire 14 clamped in the wire holder 1 as martensite, and process stage "C" shows the release of the wire 14 in the direction of the arrow 17 after the austenite triggering temperature is reached.

Figure 3:
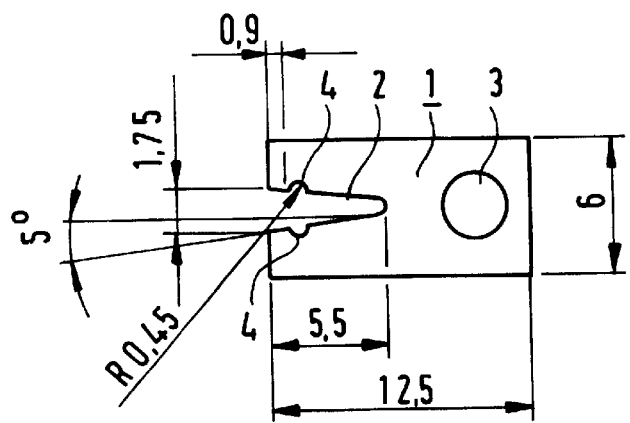
FIG. 3 shows a wire holder with additional positive connection.

FIG. 3 shows the wire holder 1 as shown in FIG. 1 with additional indentations 4 in the flanks of the aperture 2 shaped as a notch. The indentations 4 are configured as round indentations in the embodiment shown in FIG. 3, and are matched to receive a spherical widening of the wire 14. The holding force of the wire holder 1 is increased as a result of this positive connection. The dimensions of the round indentations and their position in the aperture 2 shown in FIG. 3 are given merely as examples, and may be altered as necessary. Other configurations of the positive connection differing from the spherical shape are also conceivable. For example, the widening of the wire may be in the form of an end with greater diameter than that of the wire that is received into matching indentations of the aperture 2.

Figure 4:
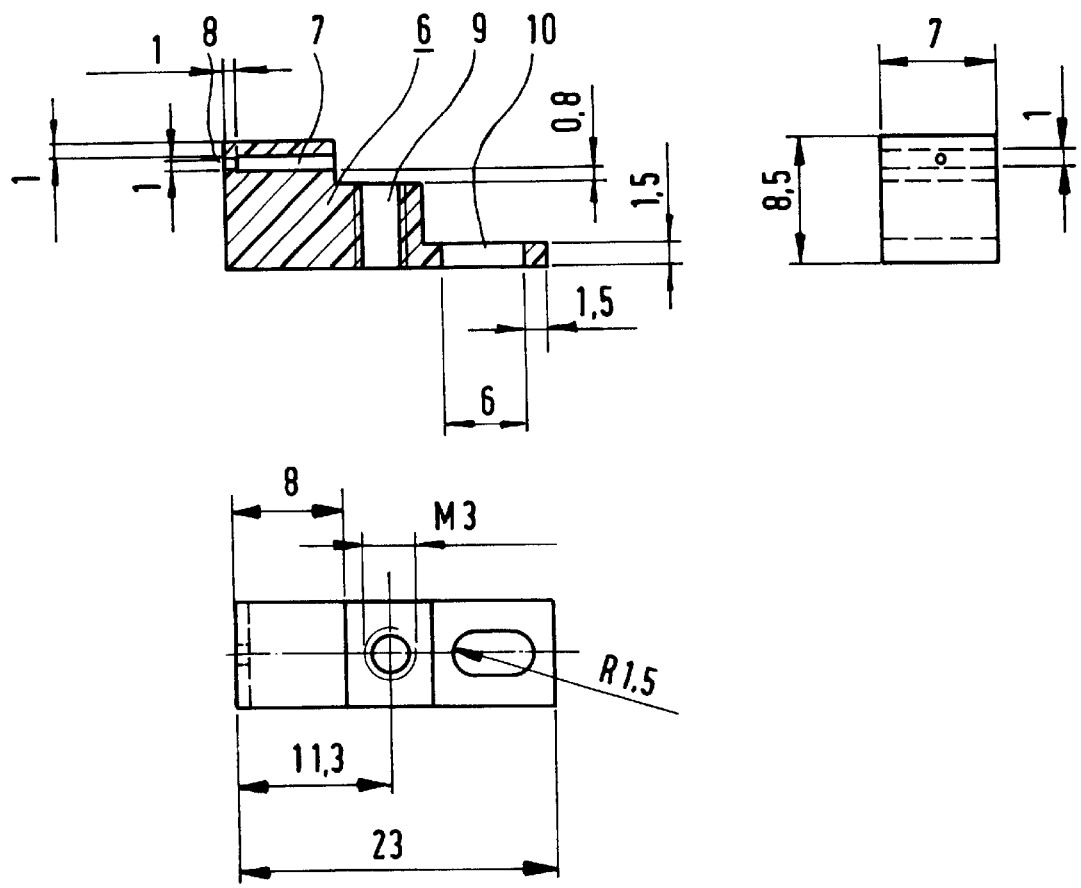
FIG. 4 shows a bracket mount.

FIG. 4 shows an embodiment example for a bracket mount 6 in lateral cross-section view, top view, and front view. The mounting bracket 6 is produced from the temperature-resistant plastic Polyetheretherketone (PEEK). This material is approved for use in space applications, and its electrical insulating characteristics are very good in comparison with other plastics. Use of other temperature-resistant and insulating materials is possible. The wire holder 1 is held in a laterally-open slot 7 and held in the slot by a plastic bolt 11 (see FIG. 5a). The bracket mount 6 includes a threaded hole 9 for this purpose. The wire holder 1 is designed and positioned with sufficient tolerance to provide a frictionless opening process in the slot, with the aperture 2 facing the closed front edge of the bracket mount, in which a passage opening 8 is provided that allows the wire 14 to be inserted into the aperture 2.

A longitudinal hole 10 in the mounting bracket 6 serves to position and secure the mounting bracket.

The dimensions shown in FIG. 4 for the mounting bracket 6 may be altered as necessary and as dictated by the dimensions of the wire holder.

Figure 5A:
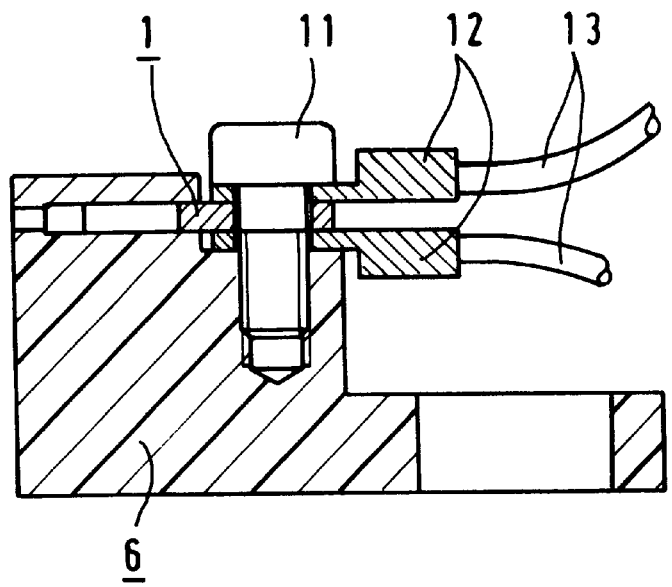
FIGS. 5a & 5b show various connection options for conduction of Joulean heat.
Figure 5B:
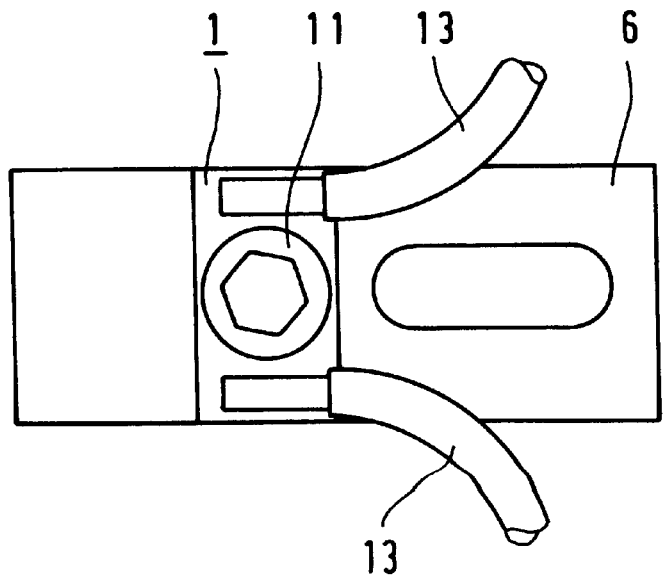

FIGS. 5a and 5b show embodiment examples for Joulean heat conduction by means of which the wire holder may be heated to the austenite triggering temperature. In FIG. 5a, in the area of the securing bolt electric current is provided from the upper part of the wire holder 1 to its lower part, thereby heating the wire holder. For this purpose, copper eyelets 12 are mounted on the ends of the current lines 13 that are pressed against the upper and lower sides of the wire holder 1 by means of the plastic bolt 11.

FIG. 5b shows an embodiment in which the electrical current is provided laterally through the wire holder to the area of the securing bolt. The uninsulated ends of the current lines 13 are mechanically clamped from both sides of the hole 3 to the upper side of the wire holder 1 for this purpose.

In addition to the heating described above, the wire holder may also be heated indirectly using Joulean heating, e.g., via attached PTC elements or other controllable heat sources.

What is claimed is:

1. Temperature-controlled wire holder (1) made of shape memory material into which a wire (14) under mechanical tension can be clamped in an aperture (2) in the holder, the wire (14) being releasable upon reaching a specific operation temperature, wherein the wire holder (1) comprises a plate made of a TiNi alloy, said plate being pre-treated by being subjected to a mechanical process consisting of rolling to constitute a means to reduce thickness of said plate so that said plate is thin and to increase the austenite triggering temperature of the shape memory alloy to 100° C., the wire (14) being clamped within said aperture (2) in the wire holder (1) by compressing the aperture (2), the aperture (2) opening by itself when the wire holder (1) is heated to the specific operation temperature, which is the austenite triggering temperature of the alloy thus releasing the wire.

2. Wire holder according to claim 1, wherein the compressed wire holder (1) opens irreversibly by a "one-way effect" of the shape memory material when the austenite triggering temperature is reached.

3. Wire holder according to claim 2, wherein the compressible aperture (2) is configured as a notch in an edge of the plate.

4. Wire holder according to claim 3, wherein the wire holder (1) is eroded from the pre-treated plate.

5. Wire holder according to claim 2, wherein the wire holder (1) is eroded from the pre-treated plate.

6. Wire holder according to claim 2, wherein the wire holder (1) is combined with a mounting bracket (6) made of sxtemperature-resistant etheretherketone plastic (PEEK).

7. Wire holder according to claim 1, wherein the compressible aperture (2) is configured as a notch in an edge of the plate.

8. Wire holder according to claim 7, wherein a positive connection for the clamping is produced by indentation (4) on both flanks of said notch in which a widened portion at the end of the wire (14) is held in when the wire holder is compressed.

9. Wire holder according to claim 8, wherein the indentations (4) are round, into which spherical widened portion of the wire (14) is clamped.

10. Wire holder according to claim 8, wherein the wire holder (1) is eroded from the pre-treated plate.

11. Wire holder according to claim 8, wherein the wire holder (1) is combined with a mounting bracket (6) made of temperature-resistant Poly-etheretherketone plastic (PEEK).

12. Wire holder according to claim 9, wherein the wire holder (1) is eroded from the pre-treated plate.

13. Wire holder according to claim 7, wherein the wire holder (1) is eroded from the pre-treated plate.

14. Wire holder according to claim 7, wherein the wire holder (1) is combined with a mounting bracket (6) made of temperature-resistant Poly-etheretherketone plastic (PEEK).

15. Wire holder according to claim 1, wherein the wire holder (1) is eroded from the pre-treated plate.

16. Wire holder according to claim 1, wherein the wire holder (1) is combined with a mounting bracket (6) made of temperature-resistant Polyetheretherketone plastic (PEEK).

17. Wire holder according to claim 1, wherein heating of the wire holder (1) to the specific operating temperature is performed using Joulean heat.

18. Wire holder according to claim 17, characterized in that the wire holder itself is used as the resistance path to create Joulean heating for the wire holder.

19. Wire holder according to claim 1, wherein the clamping process is so performed that the empty aperture (2) is compressed at low temperature, and the end of the wire (14) is subsequently inserted into the compressed opening (2).

* * * * *